United States Patent
Hyypio

Patent Number: 5,821,652
Date of Patent: Oct. 13, 1998

[54] DYNAMOELECTRIC MACHINES WITH SHAFT VOLTAGE PREVENTION METHOD AND STRUCTURE

[75] Inventor: David B. Hyypio, Rothschild, Wis.

[73] Assignee: Marathon Electric Manufacturing Corporation, Wausau, Wis.

[21] Appl. No.: 704,850

[22] Filed: Aug. 28, 1996

[51] Int. Cl.$^6$ ............................ H02K 07/66; H02K 07/10

[52] U.S. Cl. ............................ 310/83; 310/72; 310/196; 310/214; 310/215

[58] Field of Search ............................ 310/72, 83, 196, 310/214, 215

[56] References Cited

U.S. PATENT DOCUMENTS

| | | | |
|---|---|---|---|
| 3,629,624 | 12/1971 | Staudie | 310/6 |
| 3,670,192 | 6/1972 | Anderson et al. | 310/196 |
| 3,924,906 | 12/1975 | Kitaoka | 308/1 |
| 4,308,476 | 12/1981 | Schuler | 310/45 |
| 4,429,241 | 1/1984 | Ohara et al. | 310/51 |
| 4,473,765 | 9/1984 | Butman, Jr. et al. | 310/215 |
| 4,634,911 | 1/1987 | Studniarz et al. | 310/215 |
| 4,724,600 | 2/1988 | Studniarz et al. | 29/596 |
| 4,831,295 | 5/1989 | Posedel | 310/72 |
| 4,863,565 | 9/1989 | Elton et al. | 310/45 |
| 4,949,001 | 8/1990 | Campell | 310/220 |
| 4,949,023 | 8/1990 | Shlien | 310/220 |
| 4,998,103 | 3/1991 | Rosswurn et al. | 340/870 |
| 5,036,237 | 7/1991 | London | 310/172 |
| 5,043,612 | 8/1991 | Lakin | 310/45 |
| 5,066,881 | 11/1991 | Elton et al. | 310/213 |
| 5,233,499 | 8/1993 | Twerdochlib | 361/212 |
| 5,428,242 | 6/1995 | Furuya et al. | 257/538 |

OTHER PUBLICATIONS

"Shaft Voltages in Generators with Static Excitation Systems–Problems and Solutions"IEEE Trans. on Energy Conversion, vol. 3, No. 2, Jun. 1988

Primary Examiner—Steve Stephan
Assistant Examiner—Elvin G. Enad
Attorney, Agent, or Firm—Andrus, Sceales, Starke & Sawall

[57] ABSTRACT

Damaging shaft voltages in an induction motor are prevented by an electrostatic shield between the stator winding structure and the rotor structure. The electrostatic shield is held at the same potential as the grounded motor frame. The shield includes an aluminum strip in each winding slot, with one strip in firm engagement with the stator core. The strips are flat strips and extend beyond both ends of the slot to the outer end turns of the stator winding. This places that one strip at the ground reference potential of the motor frame. All strips are connected to the one grounded strip by an end ring. All others are insulated from the core. The strips are connected at only one end to avoid a squirrel cage winding affect.

9 Claims, 3 Drawing Sheets

DYNAMOELECTRIC MACHINES WITH SHAFT VOLTAGE PREVENTION METHOD AND STRUCTURE

BACKGROUND OF THE INVENTION

This invention relates to dynamoelectric machines, and particularly motors having a shaft voltage prevention structure within the machine's structure.

Shaft voltages in dynamoelectric machines and particularly motors and generators have presented a continuing problem with resulting degeneration in the capability and life of rotating machinery. For example, shaft voltage damage has been particularly noted in synchronous AC alternators with static excitation systems for driving turbojet generator. U.S. Pat. No. 4,831,295 which issued May 16, 1989 discloses a shaft mounting system for reducing shaft voltages in dynamoelectric machines. As disclosed in that patent, grounding of the dynamoelectric shaft is a well known method of preventing build up of electrostatic charges in the shaft which can cause damaging shaft currents. The problem has become particularly severe with the use of PWM inverters in connection with various wound rotor and squirrel-cage induction motors. A detailed discussion of the difficulties encountered in such motor turbojet generators is recited in a presentation paper entitled "Shaft Voltages and Generators With Static Excitation Systems-Problems and Solutions", published in the IEEE Transactions on Energy Conversion, vol. 3, no. 2, Jun. 19, 1988. A similar problem is encountered in an induction motor driven from a PWM (pulse width modulation) type inverter, wherein IGBT (insulated gate bipolar transistor) switching devices are employed.

Inspection of damaged motors indicate transverse pattern pitting of the bearing journal and a cloudy appearance of the bearing balls. The mechanical deterioration is clearly due to electric current, apparently because of electro-erosion. This process is similar to the well known process of electroplating, where the amount of metal deposited or removed depends upon the electrical current flow.

In an induction motor, the electrical driving force for the bearing current arises as a result of a shaft voltage created with respect to the grounded motor frame. With a PWM inverter source for the induction motor and the like, the frame or ground referenced voltage, also known as the common-mode voltage, is coupled to the rotor assembly capacitively from the stator winding. Traditionally, bearing currents associated with magnetic induction are caused by magnetic dissymmetries in the machine. The typical solutions have been to isolate at least one of the bearings to eliminate a closed circuit path. Bearing current damage in inverter driven motors has also lead, for example, to the application of grounding brushes to alleviate the problem. This latter solution has the distinct problem from the standpoint of maintaining integrity of the electrical contact between the brush and shaft interface. Thus, contaminants will interfere with such integrity. Brushwear and attendant maintenance are undesirable. Further, with brushwear there is the possibility of creating brush dust as a contaminant in the operating environment. In addition, there is an interface voltage drop between the brush and the shaft. Grounding systems, in general, may require special mounting considerations, and therefore result in additional design costs as well as maintenance expense.

It has also been proposed to insulate both bearings by the use of an insulating coating material to the bearing inner or outer races, and/or to make the rolling element out of an insulating material, such as ceramic. Insulation, of course, will effectively eliminate bearing currents as long as the insulation is not described and has been properly applied. However, a shaft voltage capacitive coupling mechanism remains. The shaft voltage can also do damage to other bearings of associated equipment in electrical contact therewith; such as, encoders, tachometers, blowers, gear boxes, and other elements in electrical contact to the insulated bearings.

SUMMARY OF THE PRESENT INVENTION

The inventor has realized that the best solution is eliminating the capacitive coupling created between the stator structure and the rotor structure at its very source. Generally, in accordance with the present invention, an electrostatic shield is interposed between the stator structure and the rotor structure, and generally includes an electrically conductive shielding surface or member, which is interconnected to the grounded reference, such as the frame, to establish a corresponding potential interposed between the stator structure and the rotor structure. The interconnection of the shielding to the motor frame or other reference ground is critical to prevent the shielding from floating to any electrical potential which could, of course, actually increase the capacitive coupling and result in a higher shaft voltage.

More particularly, in accordance with a preferred construction of the present invention, aluminum or other conductive materials, preferably in the form of conductive strip-like elements, are interposed into the stator slots in an area, particularly outwardly of the winding and inwardly of the slot opening as generally defined by slot lips. The elements preferably are extended from the opposite ends of the slots to the outermost end of the winding end turns. The conductive material is insulated from the winding and the magnetic core of the stator structure. The insulation of the strips from the winding will ensure dielectric withstand capability of the machine that is required for safety. Insulation from the magnetic core prevents a closed conductive path around the slot openings of the stator structure; which could result in induced currents therein and unnecessary losses and heat generation within the stator structure.

The present invention thus relies on the insertion of an electrostatic shield between the stator and the rotor, with the electrostatic shield held at substantially the same potential as the grounded frame.

In a preferred, practical construction, a non-magnetic conductive strip member is placed within each winding slot. At least one of the inserted conductive strip members is located and secured in firm interengagement with the stator core, and preferably only one is so constructed. This places that strip at the ground reference potential of the frame. All strips are connected to the grounded strip, as by a common end connector. All others are insulated from the stator core and the winding as such. The winding insulation is a safety factor to maintain the dielectric characteristic within the capacity of the motor or other dynamoelectric machines. Thus, the core insulation eliminates the closed conductor path around the stator teeth. Adjacent teeth of each slot will otherwise form a closed conductive path about the magnetic flux of the winding in the slot. This would result in an induced current in the core with the resulting unnecessary heating and loss.

The strip members are each preferably formed as a flat, strip member especially shaped to cover the winding within the slot. The strips extend beyond both ends of the slot to the outer end turns of the winding. Aluminum strips provide a particularly satisfactory member. One end of each strip is connected to the frame by a suitable end ring member which interconnects all of the strips at that end. The strips are only connected at one end to avoid the effect of creating a squirrel cage rotor winding which would result in a high induced current with associated heating and losses.

Although the aluminum strips are desirable and advantageous from a practical construction, any other type of a conductive system can be provided, including conductive coatings or foils applied to slot elements such as wedges, phase insulation and the like as well as to the faces of the insulated end turns.

The electrostatic shielding structure of the present invention permits a cost effective solution to the difficult problem of deterioration of bearing structures in induction motors and the like by substantially interrupting the capacitive coupling of the common-mode voltage from stator winding to rotor, and the resulting bearing currents induced by such coupling. Thus, the present invention substantially reduces the capacitive coupling from the stator to the rotor in such a manner as to eliminate the voltage source while maintaining appropriate insulating characteristics for normal induction motor operation.

BRIEF DESCRIPTION OF THE DRAWINGS

The drawings furnished herewith illustrate a preferred construction of the present invention in which the above advantages and features are clearly disclosed as well as others which will be readily understood from the description of the illustrated embodiment.

In the drawings.

DESCRIPTION OF THE ILLUSTRATED EMBODIMENT

Figure 1:
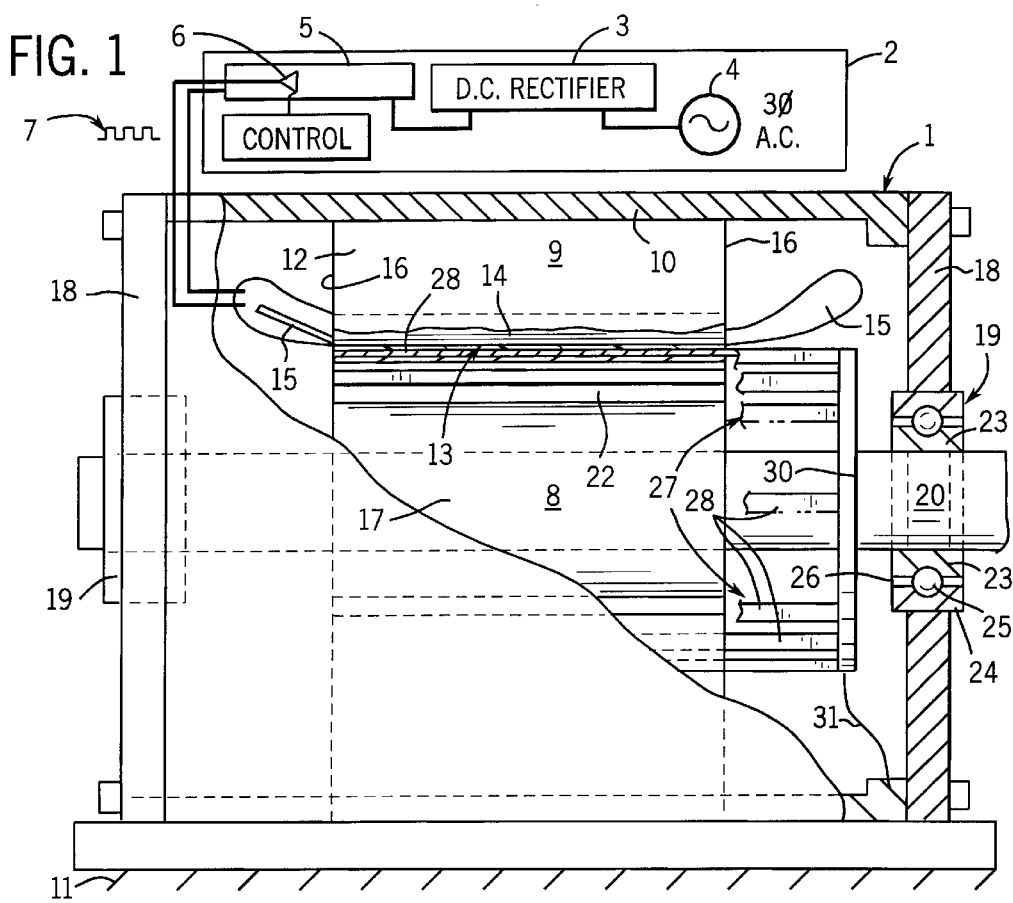
FIG. 1 is a simplified illustration of an electric induction motor connected to an inverter circuit including an inverter drive.
Figure 2:
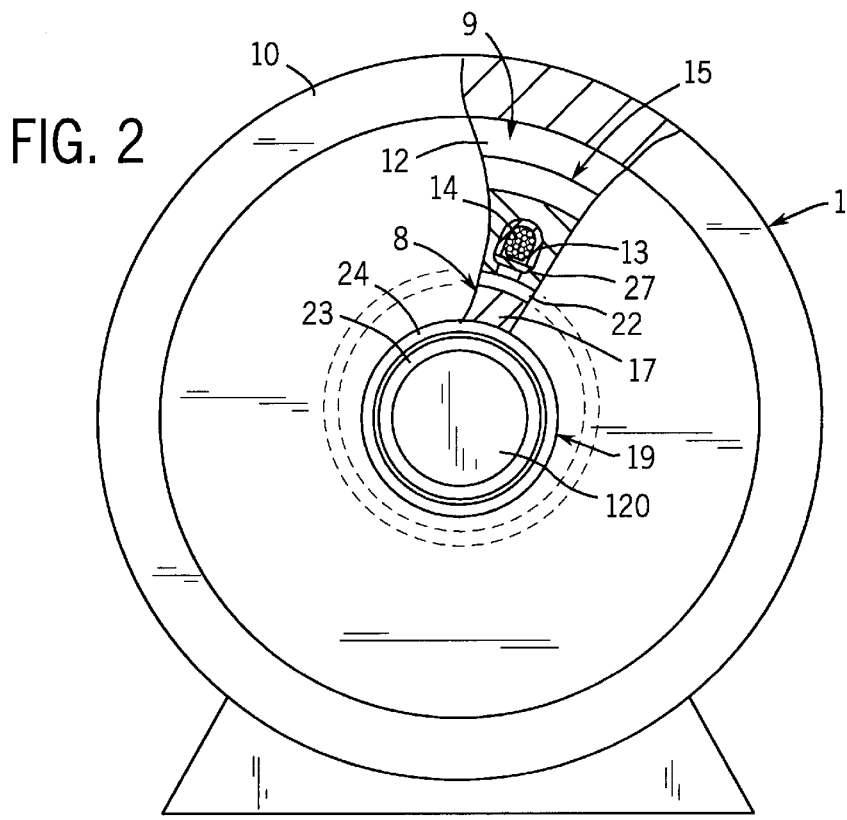
FIG. 2 is an end view, partially in section, diagrammatically illustrating the stator structure constructed in accordance with an embodiment of the present invention.

Referring to the drawing and particularly to FIGS. 1 and 2, a typical induction motor 1 is diagrammatically illustrated connected to an inverter drive 2. The inverter drive 2 is a pulse width modulating (PWM) inverter drive 2 incorporating a plurality of insulated gated bipolar transistors as switching devices connected in the output circuit. In accordance with well known inverter construction, the inverter typically includes a full wave diode rectifier 3 connected to a three phase power supply 4 and connected to supply a D.C. power to the output circuit 5. The inverter output circuit 5 preferably includes gated rectifiers 6, and particularly insulated gate bipolar transistors (IGBT), as switching devices with present technology to produce a train of pulse width modulated output signals 7 connected to the motor 1. The output circuit 5 is connected to the input of the induction motor 1. The inverter converts the DC current to an appropriate pulse width modulated input to the induction motor 1. The speed is controlled by the gating of the gated rectifiers to provide a controlled pulse width pattern.

Referring particularly to FIGS. 1 and 2, the motor 1 includes a rotor 8 which is rotatably mounted within a stator 9. The stator 9 is fixed to an outer frame 10 which is connected to ground 11 and forms the ground reference for the motor. A stator core 12 is secured within the frame 10. The core 12 is an annular core with circumferentially spacial slots 13. A stator winding 14 is wound within the circumferentially distributed slots 13. The winding 14 includes interconnected coils wound in the slots 13, with the coil end turns 15 projecting axially from the core end surfaces or faces 16.

The rotor 8 includes a rotor magnetic core 17 which is rotatably mounted in the end frames 18 secured to the motor housing 10. Rotor bearings 19 are secured in the opposite end frames 18 with a motor shaft 20, on which rotor core 17 is secured, journalled therein. An air gap 22 is provided between the cores 12 and 17.

The bearings 19 are interconnected and supported by the end frames 18 and thereby to the grounded frame 10 as the common ground.

In a typical application, each bearing as shown in FIG. 1 consists of a ball bearing unit having an inner race 23 coupled to the shaft 20 and an outer fixed race 24 secured to the end frame. Bearing balls 25 are interposed between the two races 23 and 24 and rotatably support the rotor in accordance with a well known structure and operation. Each bearing 19 includes a suitable lubrication grease 26, which electrically separates the bearing ball 25 from the respective races 23 and 24. The bearing lubricant 26 effectively forms a dielectric medium between the inner and outer races. The shaft 20 and rotor core 17 with the engaged inner races 23 is considered an equipotential surface. Each end bearing therefor forms and constitutes a small series capacitance as a result of the lubricant 26 in the bearing construction.

With the typical construction of an electric motor as described above, there is capacitive coupling between the stator structure, and particularly the stator winding 14 and the rotor structure. The shaft 12 has a non-zero voltage with respect to ground.

The present invention is particularly concerned with the eliminating of shaft currents which are created as circulating current through the rotor and particularly the rotor bearings and shaft. It is the circulating currents which tend to rapidly damage the rotor bearings. The present invention, particularly by eliminating capacitive coupling between the stator and rotor structures, eliminates the source voltage of such damaging current. Prior to further description of the illustrated embodiment, the sources and characters of a typical current is shown with respect to FIG. 1a.

Figure 1A:
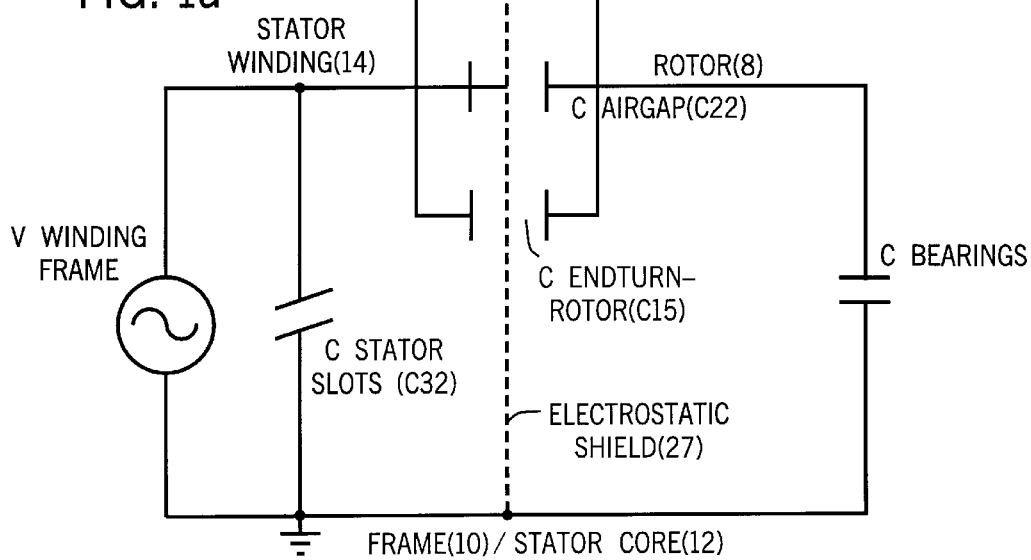
FIG. 1a is a simplified schematic diagram of the electrostatic model of an electric induction motor with the various different capacitance elements shown by a single symbol.

In FIG. 1a, the several different coupling capacitive elements presented within an induction motor are shown by a single capacitor for simplicity and clarity of description. The capacitive sources will be readily understood by those skilled in the art, and the illustration rather clearly relates to the subsequent description of the illustrated embodiment of the invention. (The capacitors are identified by the letter C with the source element number as described with respect to FIG. 1a).

Referring to FIG. 1a, winding 14 and frame 10 establish a voltage source which is referenced to the ground frame, as shown by the typical ground symbol. The stator winding 14 is schematically shown to the left side of FIGS. 1a with its slot capacitance shown by capacitor C-32 connected to the winding and to the ground. The stator winding 14 in the slot is not conductively connected to the rotor but is coupled thereto by a series capacitance between the oppositely located winding end turns 15 and by the motor air gap 22 between the rotor and stator cores shown by the three parallel connected capacitors C-13, C-15 and C-22. The three parallel capacitors are connected in series with the capacitance introduced by the lubricated ball bearings 19, shown as capacitor C-19, to the frame and ground reference voltage side of the schematic circuit. The illustrated capacitors of FIG. 1a are representations of the complex distributed capacitances of the actual motor. The values of the capacitances represented are dependent on the geometry and electrical properties of the motor as such but are proper as shown for purposes of the illustrated embodiment of the invention.

The present invention is particularly directed to electrostatically isolating the stator assembly from the rotor assembly to prevent coupling a voltage to the shaft with respect to ground. Generally, as illustrated in the schematic circuit of FIG. 1a, an electronic shield member 27 is interposed between the gap and end turn capacitance, with the shield connected directly with the ground. This, in essence, isolates or removes the capacitive coupling between the stator assembly and the rotor assembly, and prevents the build up of damaging voltage on the shaft relative to ground, and generally between the rotor shaft, and outer races which are generally between the frame and thus to ground.

With reference to the several capacitors of FIGS. 1a and the shield 27, the preferred construction of FIGS. 1–4 is described as follows:

The outer race 24 is in intimate physical and electrical contact with the motor end frames 18, which in turn, is firmly fixed to the frame 10 and the ground support structure. The stator core 12 is at the grounded equipotential surface (FIG. 1a, ground 9–10), and with the stator winding 14 forms a rather large slot capacitor C-13 connected in parallel with the network of the other capacitances in the motor assembly.

Figure 3:
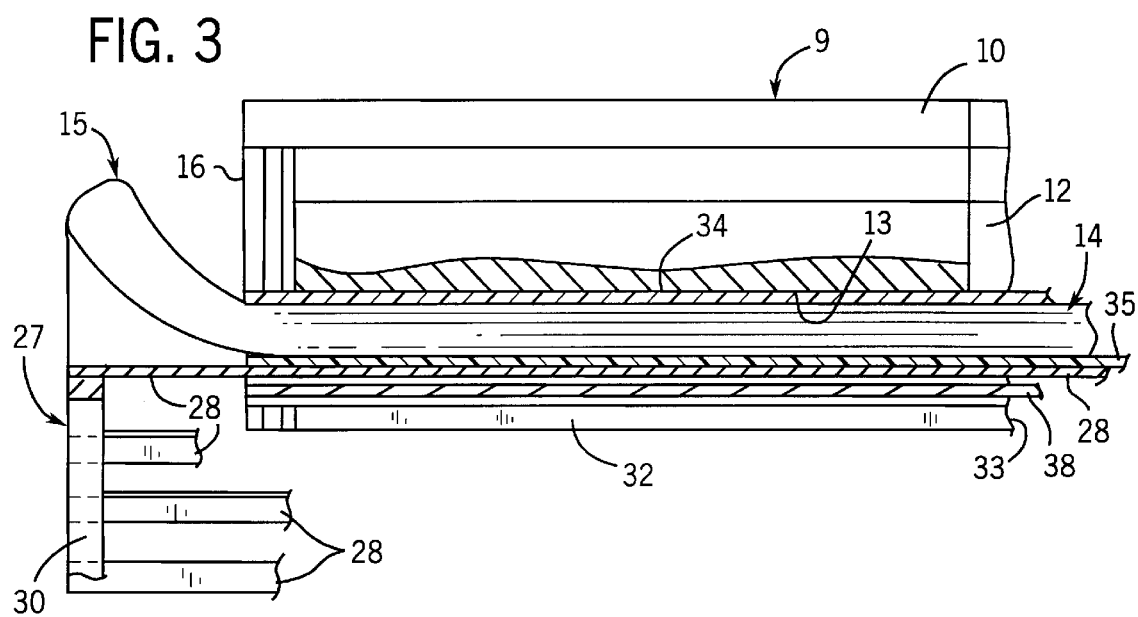
FIG. 3 is an enlarged fragmentary cross-sectional view of the stator illustration slot thereof.
Figure 4:
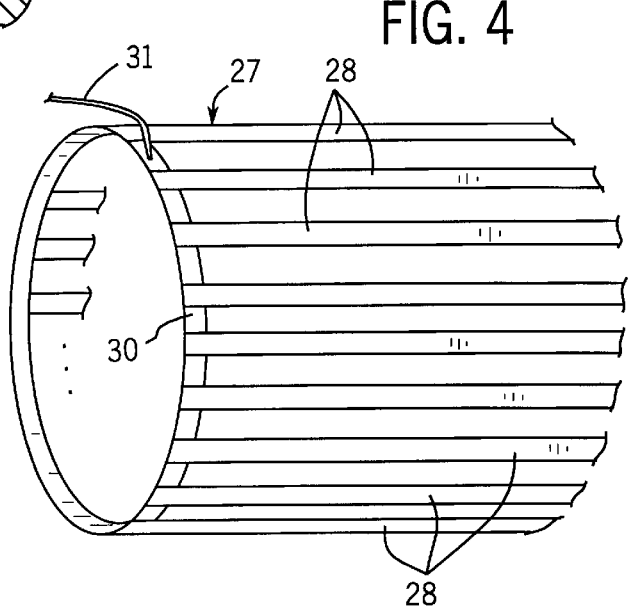
FIG. 4 is a pictorial view of the electrostatic shield structure shown in FIGS. 1–3 inclusive.

The capacitive coupling from the stator structure to the rotor structure is prevented in accordance with the teaching of the present invention by the creation of the electrostatic shield unit 27 (FIGS. 1, 1a and 4), which in the illustrated embodiment of the invention as disclosed in FIGS. 1, 3 and 4, includes interconnected conductive elements 28 located within the stator slots 13 and interconnected to each other and to the ground reference to essentially decouple the stator structure from the rotor structure, thereby eliminating shaft voltage.

Figure 5:
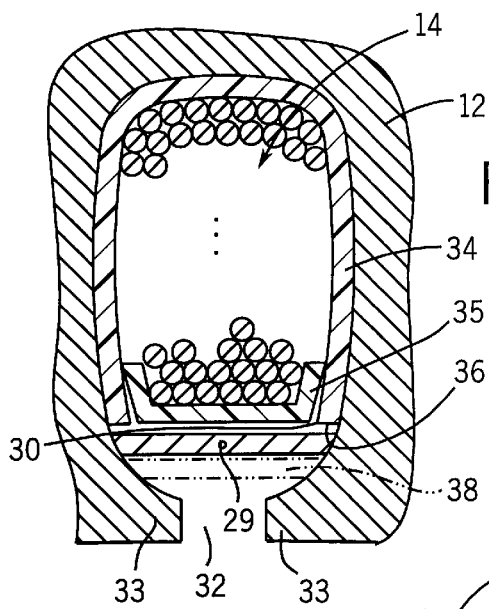
FIG. 5 is a separate enlarged view illustrating the structure of a one stator winding slot construction with an element of the shield completing the interconnection between the electrostatic shield and the motor structure.

More particularly and as most clearly shown in FIG. 3, the elements 28 of the shield unit 27 includes a plurality of conductive strips, and preferably aluminum strips, fitted one each within each stator slot 13. Each strip 28 extends throughout the length of the stator core and the winding end turns 15. The strips 28 are connected to each other at only one end by a conductor, shown as ring 30, as by welding or fastening or the like to form a good integrated conductor. The strips 28 are individually insulated from the stator winding 14 and the stator core 12 to form a unitary shield unit 27. The unit 27 is connected to the common ground references by connecting one strip 28 to the core 12 in one embodiment of the invention, as more fully described hereinafter. The end conductor or ring 30 may be connected to the frame 10 by a lead 31, as shown in FIG. 1, to connect the shield unit 27 to ground potential 11, or preferably connected thereto more fully discussed hereinafter and as shown in FIG. 5. The interconnected strips 28 form an electrostatic shield unit substantially decoupling the stator structure and the rotor structure, and thereby substantially avoid the creation of a driving voltage between the stator and rotor.

More particularly, as illustrated in FIGS. 3–5, each slot 13 includes an aluminum strip 28 which projects throughout the length of the stator unit including the core 12 and the extended end turns 15 of the stator winding 14. The strips 28 are electrically connected at one end by grounded ring 30 and all strips are thereby held at the same potential. This interconnection of adjacent strips 28 at only one end is important. Interconnecting of the strips at both ends of the strips would, of course, provide a closed current path, and during motor operation create an action similar to a squirrel cage rotor structure. The interconnected strips 28 would then carry high level induced current with attendant losses and heating.

Each conductive strip 28 is secured in insulated relation from the stator winding 14 and the stator core 12 by any suitable construction. In the illustrated embodiment of the invention, as most clearly shown in FIG. 5, each slot 13 has a slot opening 32 defined by small spaced lips 33. An insulating member or liner 34 abuts the inner slot surface and terminates in inwardly spaced relation to the outer lips 33 at the slot opening 32. The coil side of winding 14 is located totally within the slot liner 34. A suitable insulating wedge 35 abuts the free outer end of the winding 14 and the inner sides of the insulation liner 34. The wedge 35 firmly secures the winding 14 in place. As shown in FIG. 5, one aluminum strip 29 (identified by No. 29 to distinguish from strips 28 of the shield 27) is fixed within the slot 13 spaced outwardly of the outer ends 36 of the slot liner 34 and generally abutting the outer surface of the insulating wedge, as shown in FIG. 5. The strip 29 firmly engages the adjacent stator core and thereby connects the strip 29 to the stator core 12, and through the mounting of core 12 to frame 10. The strip 29 is connected the reference ground 11, as shown in FIG. 1.

Figure 6:
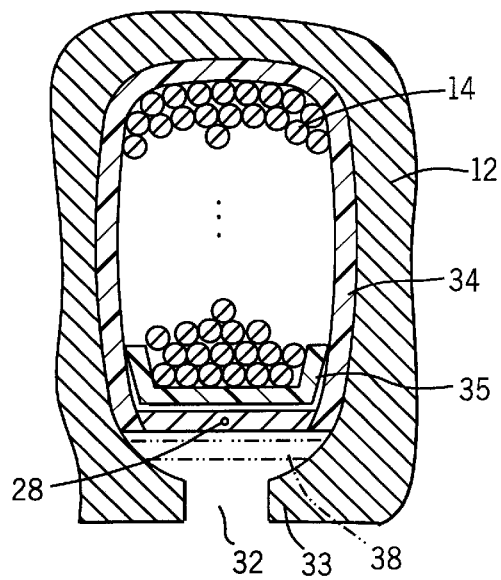
FIG. 6 is a view similar to the slot construction for all other stator winding slots.

The other conductive strips 28 of shield 27 in all other slots 13 are wedged within the liner 34, which projects outwardly to the lips 33, as shown at 37, to firmly secure such strips 28 in fixed and insulated relation within its slot, as shown in FIG. 6. An additional outer insulating wedge shown in phantom at 38, in FIGS. 5 and 6, may be secured within the slot 13, closing the slot opening 32 and thus assuring complete insulation of the winding and the other aluminum strips 28 from each other and from the stator core 12.

The total insulation of each strip 28, except the one strip 29, from the stator core 12 prevents establishing of a closed conductive path around the adjacent stator teeth. Absent such insulation of the conductive strips 28 other than strip 29, the tooth lamination at the end of the stator core 12 would link all the airborne flux passing through the air gap 22. The result would be an induced current path, with a resulting current flow in the path and unnecessary and undesirable generation of heat and losses related therewith.

As previously noted, the shield unit 27 is to be connected to the reference ground, preferably through the motor frame 10 directly in order to establish a corresponding ground potential, as illustrated in FIG. 5. This places the single interconnected strip at the potential of the stator core and thereby the frame 10, and places that strip at ground reference potential. As the other strips 28 are connected at the one end by the conductive ring 30 to the grounded strip 28, the total shield unit 27 is at the same potential. The connection of the single strip essentially provides the desired result without creating any closed path within which an induced current can follow.

The motor operates with the shield unit 27 at the same potential as the frame 10. This essentially isolates the capacitive characteristic of the stator winding 14 and core 12 as well as the bearing capacitance, and prevents capacitive coupling thereof to the rotor assembly through the air gap 22 between the rotor core 17 and the stator core 12 and between the stator end turns 15 and the rotor core 17. Both couplings are normally through the air existing between the respective elements, with the air gap between the cores establishing a most significant capacitive coupling.

As a result, the rotor assembly and the shield is at a similar equipotential surface resulting in elimination of the winding voltage impressed by the pulse train 7 of the PWM inverter 5 from being coupled to the equipotential surface of the rotor assembly. Thus, the capacitance between the stator winding end turns 15 and the rotor assembly, as well as the larger capacitance created by the air gap 22 between the stator core 12 and the rotor core 17 are essentially interrupted by the electrostatic shield unit and the voltage potential across each bearing 19 is essentially eliminated. Without the voltage across the bearings, circulation of currents through the bearings and the shaft structure does not occur.

The present invention has been found to provide a highly completely satisfactory operation of induction motors driven from the PWM inverters.

Various variations in the structure of the electrostatic shield and its interconnection into the system may, of course, be provided within the teaching of the present invention, and such modifications will occur to those skilled in the art in developing particular applications of the present invention. For example, the material of the shield can be any conductive material limited only by the mechanical strength and the electrical conductivity to provide the desired effective shielding. The shape of the strips can be altered, particularly, for example, in the area of the end turns of the stator winding to increase and provide better coverage of the stator winding, if desired or necessary. Although the direct grounding of the shield strips to the stator core provides a particularly satisfactory solution, any other method of grounding the shield can be provided. For example, lead wire connection or other connections can be added to or replace the press fit of a strip within the slots. The flat, continuous conductive strip structure, of course, can be replaced with other forms of strip elements such as a mesh screen, a carrier member with an applied conductive coating, or any other system which is compatible with the fabrication process and/or assembly process. For example, an applied conductive coating might be applied to the existing slot wedges, to phase insulating paper within the stator winding, within or as part of the lacing tie cord for the end turn conductors, and the like. With an electrostatic coating applied to the slot wedges or the like, it is preferable to provide an extension system to the end turns to provide the total shielding, including that between the end turns and the rotor assembly. In summary, the present invention is particularly directed to providing an electrostatic shield by introduction of an electrostatic conductive means between the stator winding and the rotor unit to eliminate capacitive coupling therebetween and minimize or substantially eliminate shaft and bearing currents.

Various modes of carrying out the invention are contemplated as being within the scope of the following claims particularly pointing out and distinctly claiming the subject matter which is regarded as the invention.

I claim:

1. A dynamoelectric machine structure having a stator unit mounted to a common reference ground and including a stator core having winding slots and a stator winding wound in said slots in combination with a rotor unit having a shaft, said rotor unit being rotatably mounted with said shaft in a bearing structure secured to said common reference ground with said stator unit and being magnetically coupled to said stator winding, the improvement including an electrostatic shield unit interposed between the stator winding and said rotor unit, said shield unit including conductive strip means located within the slots and insulated from said core, a connection means including a single connection of each of said conductive strip means to said common reference ground establishing said strip means at said common reference around and thereby preventing circulating current flow in said shield unit and effectively electrostatically decoupling the stator winding from said rotor unit and thereby substantially eliminating current through said bearing structure.

2. The dynamoelectric machine structure in claim 1 wherein the bearing structure is a lubricated bearing unit.

3. The structure of claim 2 wherein said stator includes an annular core having circumferentially spaced winding slots with said winding wound in said slots and having projecting end turns, said conductive strip means includes a plurality of individual conductive shield strip elements with at least one strip element within each said slot and with each strip element projecting outwardly from said slots, and said connector means includes an electrical conductive assembly interconnecting an outer end of each strip to said common reference ground to form said electrostatic shield.

4. The structure of claim 3 wherein said connection means includes a single conductive member interconnected to said outer end of each said conductive strip elements and said common reference ground.

5. The structure of claim 3 wherein each conductive shield strip element is a metal strip, said connecting means including one of said strips being connected to said stator core and said single conductive member is a conductive ring connecting the metal strips to each other at said outer end of the strips.

6. The structure of claim 5 wherein each said metal strip and said conductive ring are formed of aluminum.

7. A dynamoelectric machine, comprising an outer frame, a stator structure mounted in said frame, end frames secured to the outer frame and each including a rotary ball bearing unit, a rotor having a shaft supported in said rotary ball bearing units, said stator structure including a core mounted on said shaft and having circumferentially spaced slots having an inner slot opening, a winding wound within said slots and inwardly spaced to said slot opening, said winding being insulated from said core, an elongated conductive member located within each of said slots and insulated from said winding and from said core, each said elongated conductive member extending outwardly from the end of said stator core into alignment with the winding end turns, and an electrical connecting assembly connecting said conductive members and said stator core to a common reference ground and maintaining said strips and said core of said stator assembly at said common reference ground, said connecting assembly preventing magnetically induced current flow through said conductive members.

8. An induction motor in combination with a PWM inverter drive connected to operate said induction motor, a cylindrical outer frame defining a common reference ground, said induction motor comprising an annular stator core fixed within and electrically connected to said outer frame defining a common ground reference, said stator core having axial opposite ends and including a plurality of circumferentially spaced winding slots and including a stator winding wound in said slots with end turns projecting from the opposite axial ends of said annular stator core, each slot having a slot opening, an insulating liner located in each said slot between the winding and adjacent walls of the slots and extending outwardly to close spaced relation to the slot opening, an insulator within the slot adjacent the winding, a conductive strip located one each within each of said slots, each said strip being totally insulated from said winding and from said core, and one end of each of said strips being interconnected to said stator frame and establishing said strips at the common reference ground of said frame and core without current flow through said magnetic strips.

9. The method of eliminating bearing currents in a dynamoelectric machine having a wound stator secured within a grounded support structure defining a common ground reference and with circumferentially distributed windings located within slots in a stator core and having a rotor rotatably mounted in rotary bearings connected to said common reference ground, said rotor being located within the stator core, each rotary bearing including a lubricant forming an effective dielectric gap, comprising inserting an electrostatic shield unit between said rotor and said stator including said winding, said shield unit including individual electrical conductors located within said slots, and providing electrical insulation of said electrical conductors from said support structure and from said windings, and connecting said shield unit to said common ground reference structure and holding said strips at said common ground reference and thereby preventing capacitive coupling of said stator winding to said rotor assembly and preventing circulating current induced in said electrostatic shield unit.

\* \* \* \* \*